May 26, 1936.　　　A. M. STONER　　　2,042,197
DRILL CHUCK
Filed March 30, 1934
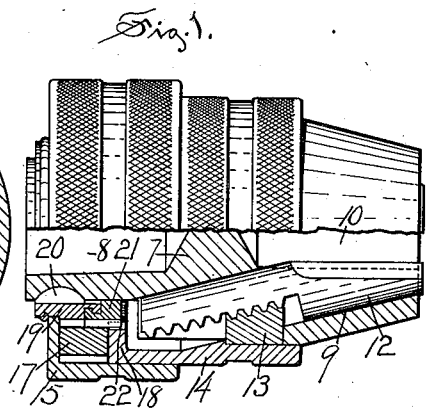
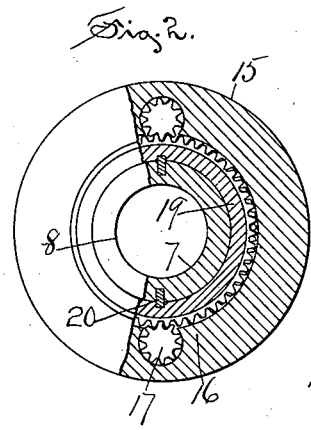
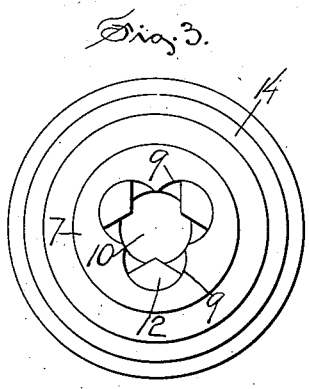
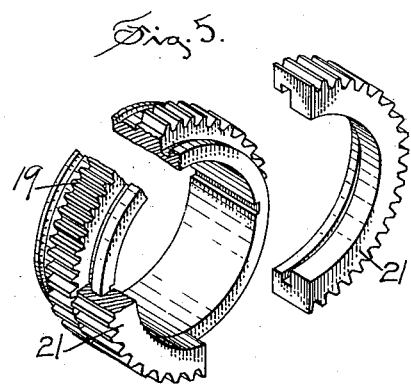
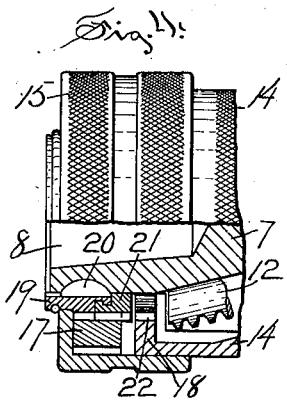
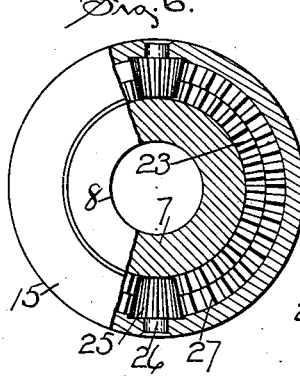
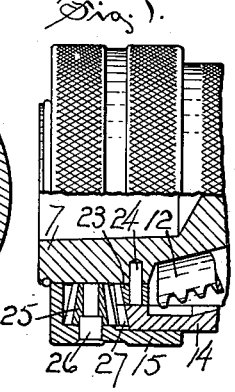
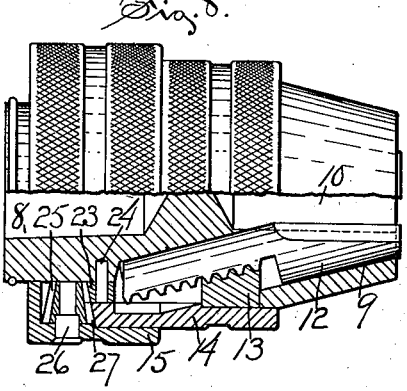
INVENTOR
Arthur M. Stoner,
by
Arthur B. Jenkins,
ATTORNEY Patented May 26, 1936

2,042,197

UNITED STATES PATENT OFFICE 2,042,197

DRILL CHUCK

Arthur M. Stoner, West Hartford, Conn., assignor to The Jacobs Manufacturing Company, Hartford, Conn., a corporation of Connecticut Application March 30, 1934, Serial No. 718,259

6 Claims. (Cl. 279—61)

My invention relates more particularly to that class of chucks above named, and an object of my invention, among others, is the production of a chuck of this type by means of which a very firm grip may be obtained upon the shank of a drill or other tool in a simple and efficient manner.

One form of chuck embodying my invention and in the construction and use of which the objects herein set out, as well as others, may be attained is illustrated in the accompanying drawing in which—

Figure 1 is a side view of my improved chuck partially broken away to show construction.

Figure 2 is an end view of said chuck, partially broken away to show construction.

Figure 3 is a view looking at the opposite end of the chuck.

Figure 4 is a fragmentary view, partially in section, showing the toothed members disengaged.

Figure 5 is an isometric view of the two gear rings with parts broken away.

Figure 6 is an end view of my improved chuck partially broken away and illustrating a modified form of construction.

Figure 7 is a view similar to Figure 4 and showing said modified form of construction.

Figure 8 is a view similar to Figure 1 and illustrating said modified form.

In the accompanying drawing the numeral 7 denotes a chuck body having a recess 8 in one end for the reception of a drill spindle, and also having grooves 9 in its opposite end inclined relatively to the axis of the body and opening into a recess 10 for the reception of the shank of a drill or similar tool. Chuck jaws 12 are located in the grooves 9, the curved ends of said jaws riding in contact with the walls of said grooves, as shown in Fig. 1 of the drawing. A jaw actuating collar 13 rotatably mounted on the chuck body has a spiral thread on its inner surface which engages the teeth on the edges of the chuck jaws, whereby rotation of said collar causes the chuck jaws to be moved longitudinally within the chuck body for the purpose of gripping or releasing the shank of a drill or other tool. A clamp sleeve 14 is rotatably mounted on the chuck body and is secured to the collar 13 as a means of rotating the latter. All of the parts thus far described are of old and well known construction and further and more detailed description is therefore omitted herein.

In order to obtain a very tight grip of the jaws 12 upon the shank of a drill or similar tool I provide a gripping sleeve 15 which is rotatably mounted on the chuck body, as herein shown its lower edge enveloping the upper edge of the clamp sleeve 14, and as shown in Fig. 1. This sleeve is of cup shape with a hole in the bottom thereof to fit the chuck body and a fillet 16, also in said bottom, said fillet having recesses, preferably two in number, to receive actuating pinions 17 which are seated upon a flange 18 at the upper end of the sleeve 14.

A stationary gear ring 19 is mounted on the upper end of the chuck body and is splined thereto for a limited axial movement thereon, as by means of a spline 20. The gear teeth on this ring are of a width equal to about half the length of the pinions 17 and mesh with the teeth of said pinions. A rotating gear ring 21 is mounted on the chuck body and has gear teeth meshing with the teeth of the pinions 17, said teeth being of a length to also mesh with the teeth 22 on the flange 18 of the sleeve 14. The ring 21 is preferably formed in segments to facilitate assembly and it is interlocked with the ring 19 as by means of interengaging lips, as shown in Figs. 1 and 5 of the drawing. The ring 19 has a lesser number of teeth than the ring 21, a difference of two teeth having been found by me to satisfactorily accomplish my purpose, so that revolution of the pinions 17 will impart a slight degree of rotation to the ring 21 through the connection of said pinions, this movement being communicated to the sleeve 14 as will be apparent.

In operation the sleeve 14 is employed in the usual manner to effect a grip of the jaws 12 upon a drill shank, the sleeve 15 being lifted during this operation to disengage the teeth of the ring 21 from the teeth of the flange 18. After a grip has been obtained upon a drill shank by the use of the sleeve 14 the disengaged teeth of the flange 18 and ring 21 are re-engaged and then by rotating the sleeve 15 a much firmer grip is obtained upon the drill shank, a fast and initial movement of the jaws 12 being obtained by operation of the sleeve 14.

In that form of the device shown in Figs. 6–8 the parts of the chuck are the same as hereinbefore described with the exception of the interengaged toothed members, which members comprise a stationary ring 23 secured to the chuck body in any suitable manner, a pin 24 being herein shown for the purpose, and a beveled pinion 25 rotatably mounted on a stud 26 is secured to the sleeve 15, the teeth of said pinion being arranged to mesh with the teeth of the ring 23 and with teeth 27 on the end of the sleeve 14 which projects within and is surrounded by the lower edge of the gripping sleeve 15, as shown in Figs. 6-8 of the drawing. The sleeve 15 is splined to the chuck body for sliding movement, as in the device first above described, to engage and disengage the teeth of the pinion 25 with the teeth of the sleeve 14 and ring 23. A difference in the number of teeth in the ring 23 and the sleeve 14 is provided for as in the first described device.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:

1. A drill chuck including a body, chuck jaws movably mounted on the body, a clamping sleeve operatively connected with said jaws for operation thereof, a gripping sleeve rotatably mounted on said body, a geared connection between said gripping and clamping sleeves and including a plurality of toothed members, each tooth of one of said members being adapted for simultaneous engagement with two members having a varied number of teeth and means for temporarily breaking said geared connection.

2. A drill chuck including a body, chuck jaws movably mounted on said body, a clamping sleeve operatively connected with said chuck jaws for operation thereof, a gear ring rotatably mounted on said body, and having teeth engaged with the teeth of said clamping sleeve, a gear ring secured to said body and having a different number of teeth from said rotatably mounted ring, said gear rings being interlocked but providing for independent rotation, a gripping sleeve rotatably mounted on said body, and a toothed actuating member carried by said gripping sleeve and having teeth engaged with the teeth of said rotatably mounted and stationary gear rings.

3. A drill chuck including a body, chuck jaws movably mounted on said body, a clamping sleeve operatively connected with said chuck jaws for operation thereof, a gear ring rotatably mounted on said body and having teeth engaged with the teeth of said clamping sleeve, a gear ring secured to said body and having a different number of teeth from said rotatably mounted ring, said gear rings being interlocked but providing for independent rotation, means for moving said rings longitudinally on said body for engagement with and disengagement from the teeth on said clamping sleeve, a gripping sleeve rotatably mounted on said body, and a toothed actuating member carried by said gripping sleeve and having teeth engaged with the teeth of said rotatably mounted and stationary gear rings.

4. A drill chuck including a body, chuck jaws movably mounted on said body, a clamping sleeve operatively connected with said chuck jaws for operation thereof, a gear ring rotatably mounted on said body and having teeth engaged with the teeth of said clamping sleeve, a gear ring splined to said body for longitudinal movement thereon and having a different number of teeth from those on said rotatably mounted ring, said gear rings being interlocked, a gripping sleeve rotatably mounted on said body, and a toothed actuating member carried by said gripping sleeve and having teeth engaging the teeth of said rotatably mounted and stationary gear rings.

5. A drill chuck including a body, chuck jaws movably mounted on said body, a clamping sleeve operatively connected with said chuck jaws for operation thereof and having teeth on its end, a gear ring secured to said chuck body and having a different number of teeth from those on said clamping ring, a gripping sleeve rotatably mounted on said body, a pinion rotatably mounted on an axis transverse to the axis of said chuck and having teeth engaged with the teeth of said gear ring and of said clamping sleeve, said gears comprising a geared connection between said sleeves, and means for temporarily breaking said geared connection.

6. A drill chuck including a body, chuck jaws movably mounted on said body, a clamping sleeve operatively connected with said jaws for operation thereof, a gripping sleeve rotatably mounted on said body, a plurality of planetary gears carried by said gripping sleeve, two gear rings having different numbers of teeth, one of said rings being secured to said body and the other of said rings being rigid with said clamping sleeve, said gears comprising a geared connection between said sleeves, and means for temporarily breaking said geared connection.

ARTHUR M. STONER.